US008098767B2

(12) United States Patent
Mirbagheri et al.

(10) Patent No.: US 8,098,767 B2
(45) Date of Patent: Jan. 17, 2012

(54) RECEIVER ADJUSTMENT BETWEEN PILOT BURSTS

(75) Inventors: Arash Mirbagheri, San Diego, CA (US); Jun Ma, San Diego, CA (US); Mingxi Fan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 870 days.

(21) Appl. No.: 11/962,040

(22) Filed: Dec. 20, 2007

(65) Prior Publication Data

US 2009/0161746 A1 Jun. 25, 2009

(51) Int. Cl.
*H03K 9/00* (2006.01)

(52) U.S. Cl. ........ 375/316; 370/320; 370/491; 370/500; 398/78; 379/343; 379/370

(58) Field of Classification Search .................. 375/148, 375/260, 346; 455/458
See application file for complete search history.

(56) References Cited

U.S. PATENT DOCUMENTS

| | | | | |
|---|---|---|---|---|
| 5,175,747 | A | 12/1992 | Murakami | |
| 6,175,588 | B1 * | 1/2001 | Visotsky et al. | 375/148 |
| 6,522,683 | B1 | 2/2003 | Smee et al. | |
| 6,745,052 | B2 | 6/2004 | Corbaton et al. | |
| 6,968,001 | B2 | 11/2005 | Jayaraman et al. | |
| 6,983,125 | B2 | 1/2006 | Smee et al. | |
| 7,006,800 | B1 | 2/2006 | Lashkarian et al. | |
| 7,012,883 | B2 | 3/2006 | Jalali et al. | |
| 7,012,952 | B2 | 3/2006 | Jayaraman et al. | |
| 7,027,503 | B2 | 4/2006 | Smee et al. | |
| 7,035,316 | B2 | 4/2006 | Smee et al. | |
| 7,035,329 | B2 | 4/2006 | Jayaraman et al. | |
| 7,046,726 | B2 | 5/2006 | Jayaraman et al. | |
| 7,054,396 | B2 * | 5/2006 | Shan | 375/346 |
| 7,082,174 | B1 | 7/2006 | Smee et al. | |
| 7,099,384 | B1 | 8/2006 | Jalali et al. | |
| 7,106,792 | B2 | 9/2006 | Corbaton et al. | |
| 7,136,428 | B2 | 11/2006 | Corbaton et al. | |
| 7,505,774 | B1 * | 3/2009 | Trott | 455/458 |
| 2001/0038665 | A1 * | 11/2001 | Baltersee et al. | 375/148 |

(Continued)

FOREIGN PATENT DOCUMENTS

DE 19926504 6/2001

(Continued)

OTHER PUBLICATIONS

European Search Report—EP10164132, Search Authority—Munich Patent Office, May 27, 2011.

(Continued)

*Primary Examiner* — David C. Payne
*Assistant Examiner* — Adolf Dsouza
(74) *Attorney, Agent, or Firm* — Kevin T. Cheatham

(57) ABSTRACT

A receiver may train its equalizer using consecutive pilot bursts, divide the traffic between the consecutive pilot bursts into multiple sub-segments, and interpolate the trained equalizer coefficients to obtain the coefficients for equalizing one or more of the sub-segments. The receiver may also determine signal to interference and noise ratio (SINR) values based on each of the consecutive pilot bursts, and interpolate the SINR for decoding one or more of the sub-segments. The receiver may be an access terminal receiver operating in a code division multiple access (CDMA) cellular system.

47 Claims, 4 Drawing Sheets

U.S. PATENT DOCUMENTS

2003/0031236 A1 2/2003 Dahlman et al.
2003/0048753 A1 3/2003 Jalali
2003/0123525 A1 7/2003 Smee et al.
2007/0195908 A1 8/2007 Attar et al.
2008/0292015 A1 * 11/2008 Lee ............................... 375/260
2009/0103666 A1 * 4/2009 Zhao et al. .................... 375/341

FOREIGN PATENT DOCUMENTS

EP 0978969 A2 2/2000
EP 1703686 A1 9/2006
GB 2247812 3/1992
WO WO2007039834 4/2007

OTHER PUBLICATIONS

David R Pauluzzi, et al., "A Comparison o f SNR Estimation Techniques for the AWGN Channel" IEEE Transactions on Communications, IEEE Service Center, Piscataway, NJ, US, vol. 48, No. 10, Oct. 1, 2000, XP011009781 ISSN : 0090-6778.
European Search Report—EP0800 6320—Search Authority—Munich—Mar. 22, 2010.
International Search Report and Written Opinion—PCT/US2008/087274—ISA/EPO—Sep. 24, 2009.
Partial European Search Report—EP0800 6320—Search Authority—Munich—Mar. 22, 2010.

* cited by examiner

RECEIVER ADJUSTMENT BETWEEN PILOT BURSTS

TECHNICAL FIELD

The present invention relates generally to wireless communications. More particularly, the invention relates to adjustment of equalizer tap coefficients and signal to interference and noise ratio estimates in a receiver.

BACKGROUND

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other standards.

A wireless access terminal, for example, a terminal in a wireless CDMA system, may receive data transmissions from one or more base stations on forward link or links. The signal transmitted by a particular base station may reach the terminal through multiple propagation paths. The received signal at the terminal may include one or more signal instances (also known as multipath components) of the signal transmitted by the base station. The word "multipath" refers to the existence of multiple propagation paths along which a signal travels from a transmitter (e.g., a base station) to a receiver (e.g., an access terminal). Each of the multipath components is also subjected to the varying physical channel response, noise, and interference. The terminal may employ an equalizer to compensate for the channel response and the multipath distortion. An equalizer may be an equalization filter with a number of delay elements and multiplication coefficients at taps corresponding to the delay elements. Some equalization techniques and equalizers are described in a commonly-assigned U.S. Pat. No. 7,301,990, entitled Equalization of Multiple Signals Received for Soft Handoff in Wireless Communication Systems; and in a commonly assigned U.S. Pat. No. 6,522,683, entitled Method and Apparatus for Adaptive Linear Equalization for Walsh Covered Modulation.

Pilot signals may be used for estimating the physical channel between a transmitter and a receiver, for example, from the base station to the access terminal in the CDMA system. A pilot signal is a signal carrying a predefined data sequence, so that distortion of the pilot can be attributed to the transmission channel, and the transmission channel can thus be estimated from the received pilot.

The pilot may be transmitted at well defined, periodic intervals of the forward link. In some CDMA systems, for example, a forward link is defined in terms of frames. A frame may include sixteen time slots. Each time slot may be 2048 chips long, corresponding to a 1.67 millisecond slot duration, and, consequently, a frame with 26.67 millisecond duration. Each slot may be divided into two half-slots, with a pilot burst of 96 chips transmitted in the middle of each half-slot. The remainder of each half-slot is occupied by two traffic carrying portions of about 400 chips each, and media access control (MAC) portions.

With each pilot burst, the equalizer is trained and its tap coefficients are adapted based on the estimate obtained with the pilot burst. The coefficients thus obtained are then used to demodulate the traffic portions on each side of the pilot burst. Because the coefficients obtained from training on a particular pilot burst are used to demodulate traffic following the pilot burst in time, the method is anti-causal.

In fast changing channel conditions, the channel may undergo a substantial variation between the time of the pilot burst and the actual transmission and receipt of data, particularly for the data that is most distant in time from the pilot burst. Proper equalizer training is important for equalizer performance and, consequently, for receiver performance. Therefore, there is a need in the art for apparatus, methods, and articles of manufacture that improve matching of equalizer coefficients to the actual transmission channel conditions at the time of the data transmission and receipt. There is also a need in the art for receivers with such improved equalizers. There is a further need in the art for wireless communication systems that employ such receivers.

Signal to noise and interference ratio (SINR) for the signal is measured during pilot bursts as well, and then used for scaling equalizer output before feeding it to a block that calculates log likelihood ratio, and/or for other processing of the transmitted information. Consequently, obtaining good SINR estimates is also important for receiver performance. Therefore, there is a need in the art for apparatus, methods, and articles of manufacture that improve SINR estimates of the actual transmission channel conditions at the time of the data transmission and receipt. There is also a need in the art for receivers that use such improved SINR estimates. There is a further need in the art for wireless communication systems that employ such receivers.

SUMMARY

Embodiments disclosed herein may address one or more of the above stated needs by providing apparatus, methods, and articles of manufacture for interpolating equalizer coefficients and/or SINR estimates between pilot bursts. The systems, methods, and articles of manufacture described below may be employed in telecommunications, including uses in cellular access terminals.

A method is described for operating a receiver in a wireless communication system. The method includes receiving a frame including a plurality of time slots. Each time slot of the plurality of time slots has two half-slots, each half-slot including two traffic segments and a pilot burst between the two traffic segments. The plurality of time slots includes a first half-slot and a second half-slot following the first half-slot. The first half-slot has a first pilot burst and a first traffic segment following the first pilot burst. The second half-slot has a second traffic segment and a second pilot burst following the second traffic segment. The method also includes dividing the first and second traffic segments into a plurality of sub-segments. The plurality of sub-segments includes a first sub-segment and a second sub-segment following the first sub-segment. The method further includes training an equalizer of the receiver on the first pilot burst to obtain a first plurality of trained tap coefficients, and training the equalizer of the receiver on the second pilot burst to obtain a second plurality of trained tap coefficients. The method further includes interpolating between the first and the second pluralities of trained tap coefficients to obtain a first set of interpolated tap coefficients for the first sub-segment, and equalizing the first sub-segment by using the first set of interpolated tap coefficients.

Another method for operating a receiver in a wireless communication system includes receiving a frame with a plurality of time slots, each time slot of the plurality of time slots having two half-slots. Each of the half-slots has two traffic segments and a pilot burst between the two traffic segments. The plurality of time slots includes a first half-slot and a second half-slot following the first half-slot. The first half-slot includes a first pilot burst and a first traffic segment following the first pilot burst, and the second half-slot includes a second traffic segment and a second pilot burst following the second traffic segment. The method also includes dividing the first and second traffic segments into a plurality of sub-segments. The plurality of sub-segments has a first sub-segment and a second sub-segment following the first sub-segment. The method further includes measuring signal to interference and noise ratio of the first pilot burst to obtain a first measured SINR, and measuring signal to interference and noise ratio of the second pilot burst to obtain a second measured SINR. The method further includes interpolating between the first measured SINR and the second measured SINR to obtain a first interpolated SINR for the first sub-segment. The method further includes providing at least some data in the plurality of sub-segments to a user.

A wireless terminal is described. the wireless terminal includes a receiver, a memory, and a controller coupled to the receiver and the memory. The controller is configured to receive a plurality of time slots, each time slot of the plurality of time-slots including two half-slots. Each half-slot has two traffic segments and a pilot burst between the two traffic segments. The plurality of time slots includes a first half-slot and a second half-slot following the first half-slot. The first half-slot has a first pilot burst and a first traffic segment following the first pilot burst. The second half-slot has a second traffic segment and a second pilot burst following the second traffic segment. The controller is also configured to divide the first and the second traffic segments into a plurality of sub-segments. The plurality of sub-segments includes a first sub-segment and a second sub-segment following the first sub-segment. The controller is also configured to train an equalizer on the first pilot burst to obtain a first plurality of trained tap coefficients, and to train the equalizer on the second pilot burst to obtain a second plurality of trained tap coefficients. The controller is further configured to interpolate between the first and the second pluralities of trained tap coefficients to obtain a first set of interpolated tap coefficients for the first sub-segment. The controller is further configured to equalize the first sub-segment by using the equalizer with the first set of interpolated tap coefficients.

A wireless terminal is described. The wireless terminal includes a receiver, a memory, and a controller coupled to the receiver and the memory. The controller is configured to receive a plurality of time slots, each time slot of the plurality of time-slots having two half-slots. Each half-slot includes two traffic segments and a pilot burst between the two traffic segments. The plurality of time slots includes a first half-slot and a second half-slot following the first half-slot, with no half-slot separating the first half-slot and the second half-slot. The first half-slot includes a first pilot burst and a first traffic segment following the first pilot burst, and the second half-slot includes a second traffic segment and a second pilot burst following the second traffic segment. The controller is also configured to divide the first and the second traffic segments into a plurality of sub-segments. The plurality of sub-segments includes a first sub-segment and a second sub-segment following the first sub-segment. The controller is further configured to measure signal to interference and noise ratio of the first pilot burst to obtain a first measured SINR, and to measure signal to interference and noise ratio of the second pilot burst to obtain a second measured SINR. The controller is further configured to interpolate between the first measured SINR and the second measured SINR to obtain a first interpolated SINR for the first sub-segment. The controller is further configured to provide at least some data in the plurality of sub-segments to a user.

A wireless terminal is described. The wireless terminal includes a means for receiving a wireless signal, a means for equalizing, a means for storing data, and a means for processing. The means for processing is coupled to the means for receiving, the means for equalizing, and the means for storing. The means for processing is configured to receive a plurality of time slots, each time slot of the plurality of time-slots having two half-slots. Each of the half-slots has two traffic segments and a pilot burst between the two traffic segments. The plurality of time slots includes a first half-slot and a second half-slot following the first half-slot, with no half-slot separating the first half-slot and the second half-slot. The first half-slot includes a first pilot burst and a first traffic segment following the first pilot burst, and the second half-slot includes a second traffic segment and a second pilot burst following the second traffic segment. The controller is also configured to divide the first and the second traffic segments into a plurality of sub-segments. The plurality of sub-segments includes a first sub-segment and a second sub-segment following the first sub-segment. The controller is further configured to train the means for equalizing on the first pilot burst to obtain a first plurality of trained tap coefficients, and to train the means for equalizing on the second pilot burst to obtain a second plurality of trained tap coefficients. The controller is further configured to interpolate between the first and the second pluralities of trained tap coefficients to obtain a first set of interpolated tap coefficients for the first sub-segment. The controller is further configured to equalize the first sub-segment by using the first set of interpolated tap coefficients. The controller is further configured to provide at least some data in the plurality of sub-segments to a user.

A wireless terminal is described. The wireless terminal includes a means for receiving a wireless signal, a means for equalizing, a means for storing data, and a means for processing. The means for processing is coupled to the means for receiving, the means for equalizing, and the means for storing. The means for processing is configured to receive a plurality of time slots, each time slot of the plurality of time-slots having two half-slots. Each of the half-slots has two traffic segments and a pilot burst between the two traffic segments. The plurality of time slots includes a first half-slot and a second half-slot following the first half-slot, with no half-slots separating the first half-slot and the second half-slot. The first half-slot includes a first pilot burst and a first traffic segment following the first pilot burst. The second half-slot includes a second traffic segment and a second pilot burst following the second traffic segment. The controller is also configured to divide the first and the second traffic segments into a plurality of sub-segments. The plurality of sub-segments includes a first sub-segment and a second sub-segment following the first sub-segment. The controller is further configured to measure signal to interference and noise ratio of the first pilot burst to obtain a first measured SINR, and to measure signal to interference and noise ratio of the second pilot burst to obtain a second measured SINR. The controller is further configured to interpolate between the first measured SINR and the second measured SINR to obtain a first interpolated SINR for the first sub-segment. The controller is further configured to provide at least some data in the plurality of sub-segments to a user.

A machine-readable medium is described. The medium stores instructions. When the instructions are executed by at least one processor of a wireless access terminal, they cause the access terminal to perform a number of steps. The steps include receiving a plurality of time slots, each time slot of the plurality of time-slots having two half-slots. Each of the half-slots includes two traffic segments and a pilot burst between the two traffic segments. The plurality of time slots includes a first half-slot and a second half-slot following the first half-slot. The first half-slot includes a first pilot burst and a first traffic segment following the first pilot burst. The second half-slot includes a second traffic segment and a second pilot burst following the second traffic segment. The steps also include dividing the first and the second traffic segments into a plurality of sub-segments. The plurality of sub-segments has a first sub-segment and a second sub-segment following the first sub-segment. The steps further include training an equalizer on the first pilot burst to obtain a first plurality of trained tap coefficients, and training the equalizer on the second pilot burst to obtain a second plurality of trained tap coefficients. The steps further include interpolating between the first and the second pluralities of trained tap coefficients to obtain a first set of interpolated tap coefficients for the first sub-segment. The steps further include equalizing the first sub-segment by using the first set of interpolated tap coefficients.

A machine-readable medium is described. The medium stores instructions. When the instructions are executed by at least one processor of a wireless access terminal, the instructions cause the wireless access terminal to perform a number of steps. The steps include receiving a plurality of time slots, each time slot of the plurality of time-slots having two half-slots. Each of the half-slots includes two traffic segments and a pilot burst between the two traffic segments. The plurality of time slots includes a first half-slot and a second half-slot following the first half-slot, with no half-slot separating the first half-slot and the second half-slot. The first half-slot includes a first pilot burst and a first traffic segment following the first pilot burst. The second half-slot includes a second traffic segment and a second pilot burst following the second traffic segment. The steps also include dividing the first and the second traffic segments into a plurality of sub-segments. The plurality of sub-segments includes a first sub-segment and a second sub-segment following the first sub-segment. The steps further include measuring signal to interference and noise ratio of the first pilot burst to obtain a first measured SINR, and measuring signal to interference and noise ratio of the second pilot burst to obtain a second measured SINR. The steps further include interpolating between the first measured SINR and the second measured SINR to obtain a first interpolated SINR for the first sub-segment. The steps further include providing at least some data in the plurality of sub-segments to a user.

These and other aspects of the present invention will be better understood with reference to the following description, drawings, and appended claims.

DETAILED DESCRIPTION

Figure 1:
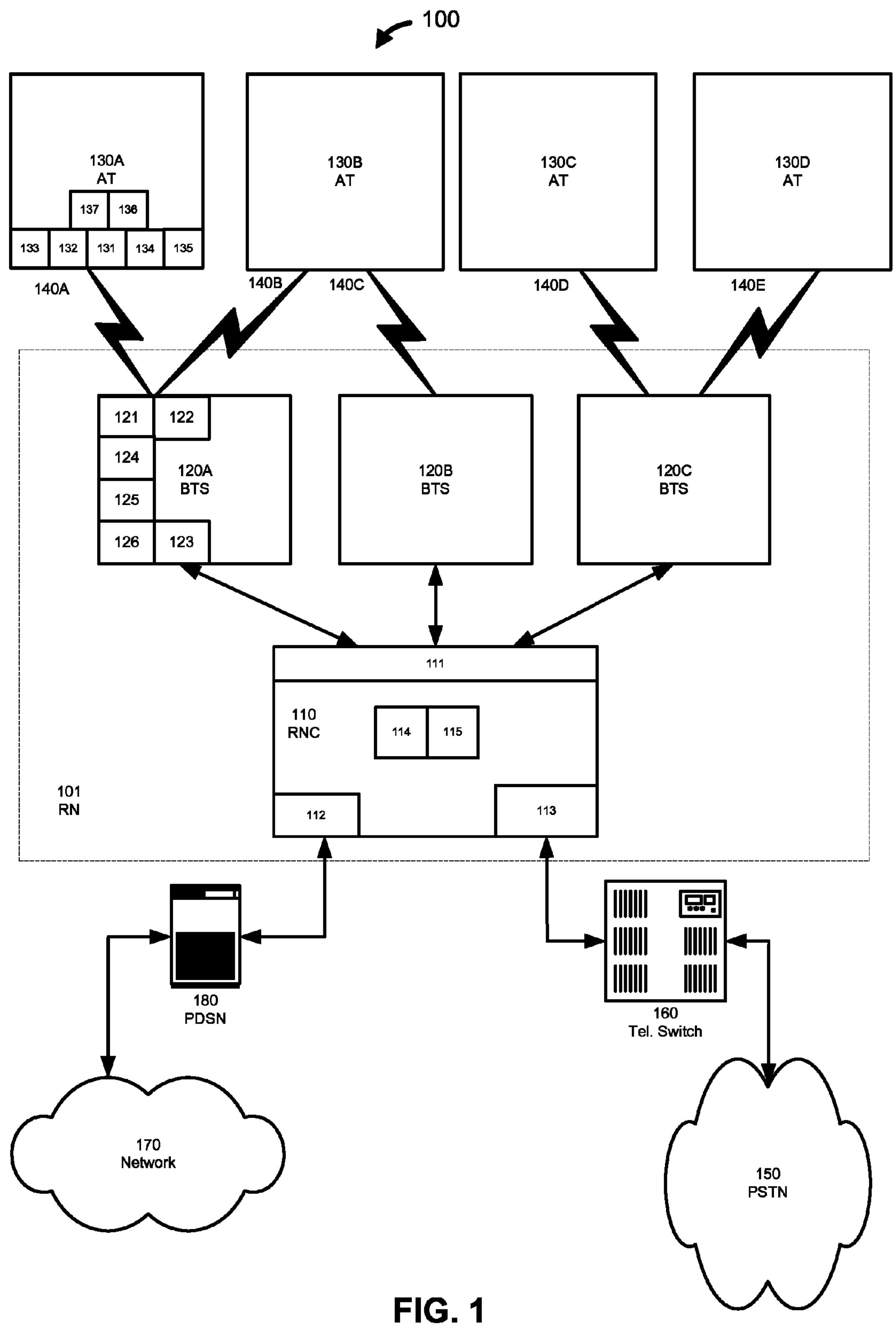
FIG. 1 illustrates selected components of a communication network in which a receiver interpolates equalizer coefficients and/or SINR values.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expressions "alternative embodiment," "alternatively," and similar phrases may be used to indicate one of a number of different possible embodiments. The number of possible embodiments is not necessarily limited to two or any other quantity.

The concept of "interpolation" signifies any process of calculating (approximating or estimating) a new point between two existing data points, based on the existing data points.

An access terminal, which also may be referred to as AT, subscriber station, user equipment, UE, mobile terminal, MT, or cellular communication device may be mobile or stationary, and may communicate with one or more base transceiver stations. An access terminal may be any of a number of types of devices, including but not limited to personal computer (PC) card, external or internal modem, wireless telephone, and personal digital assistant (PDA) with wireless communication capability. An access terminal transmits and receives data packets to or from a radio network controller through one or more base transceiver stations.

Base transceiver stations and base station controllers are parts of a network called radio network, RN, access network, or AN. A radio network may be a UTRAN or UMTS Terrestrial Radio Access Network. The radio network may transport data packets between multiple access terminals. The radio network may be further connected to additional networks outside the radio network, such as a corporate intranet, the Internet, a public switched telephone network (PSTN), or another radio network, and may transport data and voice packets between each access terminal and such outside networks. Depending on conventions and on the specific implementations, a base transceiver station may be referred to by other names, including Node-B, base station system (BSS), and simply base station. Similarly, a base station controller may be referred to by other names, including radio network controller, RNC, controller, mobile switching center, or serving GPRS support node.

The scope of the invention extends to these and similar wireless communication system components, as well as to other electronic equipment.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

FIG. 1 illustrates selected components of a communication network 100, which includes a radio network controller 110 coupled to wireless base transceiver stations 120A, 120B, and 120C. The base transceiver stations 120 communicate with access terminals 130A, 130B, 130C, and 130D through wireless connections 140A through 140E. The radio network controller 110 is coupled to a public switched telephone network 150 through a telephone switch 160, and to a packet switched network 170 through a packet data server node ("PDSN") 180. Data interchange between various network elements, such as the radio network controller 110 and the packet data server node 180, can be implemented using any number of protocols, for example, the Internet Protocol ("IP"), an asynchronous transfer mode ("ATM") protocol, T1, E1, frame relay, and other protocols.

The communication network 100 may provide both data communication services and cellular telephone services to the access terminals 130. Alternatively, the communication network 100 may provide only data services or only telephone services.

Multiple or even all the access terminals 130 may be in the same cell or site, or each access terminal 130 may be in a separate cell or site.

A typical access terminal, for example, the access terminal 130A, includes receive circuitry 131, transmitter circuitry 132, encoder 133, decoder 134, equalizer 135, processor 136, and memory device 137. The access terminal may also include or be connected to one or more user interface devices, such as a microphone, a speaker, a display, or a key pad. The receiver, transmitter, encoder, decoder, and equalizer are configured by the processor executing code stored in the memory device. Each access terminal 130 is configured to communicate data using at least one transmission protocol, such as the wireless packet transmission protocols described above. The access terminals 130 communicate with the base transceiver stations 120 via communication channels 140A through 140E, as shown in FIG. 1. Each communication channel 140 may include both a forward link and a reverse link to a corresponding access terminal 130.

Each of the base transceiver stations 120 includes one or more wireless receivers (e.g., the receiver 121 of the BTS 120A), one or more wireless transmitters (e.g., the transmitter 122 of the BTS 120A), radio network controller interface (e.g., the interface 123), a memory (e.g., the memory 124), a processor (e.g., the processor 125), and encoder/decoder circuitry (e.g., the encoder/decoder circuitry 126). A receiver/transmitter pair of each base transceiver station is configured by the station's processor operating under control of program code stored in the BTS's memory, to establish forward and reverse links with the access terminals 130 in order to send data packets to and receive data packets from the access terminals 130. In the case of data services, for example, the base transceiver stations 120 receive forward link data packets from the packet switched network 170 through the packet data server node 180 and through the radio network controller 110, and transmit these packets to the access terminals 130. The base transceiver stations 120 receive reverse link data packets that originate at the access terminals 130, and forward these packets to the packet switched network 170 through the radio network controller 110 and the packet data server node 180. In the case of telephone services, the base transceiver stations 120 receive forward link data packets from the telephone network 150 through the telephone switch 160 and through the radio network controller 110, and transmit these packets to the access terminals 130. Voice carrying packets originating at the access terminals 130 are received at the base transceiver stations 120 and forwarded to the telephone network 150 via the radio network controller 110 and the telephone switch 160.

Alternatively, the transmitter and the receiver of the BTSs may have one or more separate processors each.

The radio network controller 110 includes one or more interfaces 111 to the base transceiver stations 120, an interface 112 to the packet data server node 180, and an interface 113 to the telephone switch 160. The interfaces 111, 112, and 113 operate under control of one or more processors 114 executing program code stored in a memory device 115.

As illustrated in FIG. 1, the network 100 includes one public switched telephone network, one packet switched network, one base station controller, three base transceiver stations, and four access terminals. A person skilled in the art would recognize, after perusal of this document, that alternatively networks need not be limited to any particular number of these components. For example, a lesser or a greater number of base transceiver stations and access terminals may be included. Furthermore, the communication network 100 can connect the access terminals 130 to one or more additional communication networks, for example, a second wireless communication network having a number of wireless access terminals.

Figure 2:
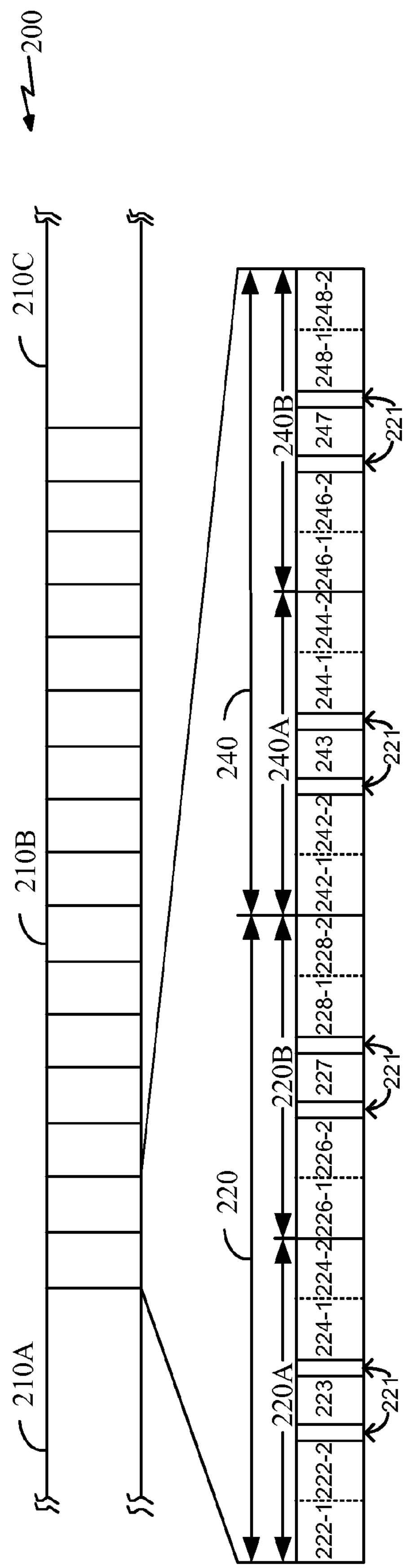
FIG. 2 illustrates selected elements of frames of a forward link wherein traffic half-slots are sub-segmented for interpolation of equalizer coefficients and/or SINR values.

FIG. 2 shows frames 210A, 210B, and 210C of a channel of a forward link 200 between a selected BTS 120 and a selected access terminals 130. The selected BTS may be the BTS 120A, and the selected access terminal may be the access terminal 130A; for simplicity, from now on we will refer to these network devices simply as the BTS 120 and the access terminal 130, respectively. Note that although only three frames are shown in FIG. 2, many additional frames may be, and typically are, present. In an exemplary system, each frame has sixteen time slots, each time slot being 2048 chips long and corresponding to 1.67 millisecond slot duration; each frame thus is 26.67 milliseconds in duration. The time slots of the frame 210B include consecutive time slots 220 and 240, which are shown in additional detail. Note that other time slots would appear the same or substantially the same at this level of abstraction.

Each slot is divided into two half-slots, with a pilot bursts transmitted in the middle of each half-slot. The time slot 220 thus has half-slots 220A and 220B, with a pilot burst 223 in the middle of the half-slot 220A, and another pilot burst 227 in the middle of the half-slot 220B; the time slot 240 similarly has half-slots 240A and 240B, with pilot bursts 243 and 247, respectively. Each pilot burst is surrounded by MAC portions 221. Each combination of a pilot burst with its surrounding MAC portions breaks the corresponding half-slot into two traffic carrying segments. Here, "traffic" refers to data other than pilot bursts and MAC portions; traffic typically includes payload data. As shown in FIG. 2, the segments of the time slots 220 and 240 are, in progressive time order, segments 222, 224, 226, 228, 242, 244, 246, and 248. Each of these segments may be 400 chips in length, while each of the pilot bursts 223, 227, 243, and 247 may be 96 chips in length.

The access terminal 130 includes a receiver with the receive circuitry 131, the decoder 134, and the equalizer 135. The functioning of the access terminal and its components is controlled by the processor 136 executing instruction stored in the memory 137. In operation, the receiver receives the forward link with the frames 210, including the pilot bursts 223, 227, 243, and 247 in the time slots 220/240. The access terminal uses the received pilot bursts to train the equalizer 135, obtaining corresponding sets of tap coefficients for demodulating the traffic in the traffic carrying segments.

A single set of coefficients thus obtained, however, is not necessarily used to demodulate the two traffic segments on either side of the pilot burst that was used for obtaining the set of coefficients. Instead, each segment is broken into multiple sub-segments. As shown in FIG. 2, for example, each of the segments is divided into two sub-segments, although a different number may be used. The segment 222 is thus divided into sub-segments 222-1 and 222-2, the segment 224 is thus divided into sub-segments 224-1 and 224-2, and so on with appropriate changes to the segment number. For demodulating at least some of these sub-segments, the tap coefficients of the equalizer are determined by interpolating the coefficients determined by equalizer training on the immediately preceding and immediately following pilot bursts.

The coefficients may be linearly interpolated between those determined for the successive (i.e., consecutive) pilot bursts. Let us designate sets of coefficients determined (through training) for the successive pilot bursts 223 and 227 as $CT_k$ and $CT_{k+1}$, respectively, where the subscripts refer to the time index of the pilot bursts (which is the same as the index of the half-slot). Let us also designate the set of equalizer tap coefficients used for demodulating the sub-segments 224-1 as $C_{k,1}$. This latter set of coefficients can then be determined by linear interpolation over time between $CT_k$ and $CT_{k+1}$:

$$C_{k,1}=(4/5)*CT_k+(1/5)*CT_{k+1}.$$

Designating the sets of equalizer coefficients used for demodulating the sub-segments 224-2, 226-1, and 226-2 as $C_{k,2}$, $C_{k,3}$, and $C_{k,4}$, respectively, their values can be derived as follows:

$$C_{k,2}=(3/5)*CT_k+(2/5)*CT_{k+1};$$

$$C_{k,3}=(2/5)*CT_k+(3/5)*CT_{k+1}; \text{ and}$$

$$C_{k,4}=(1/5)*CT_k+(4/5)*CT_{k+1}.$$

Note that the second subscript j in the $C_{k,j}$ quantities corresponds to the index of the specific sub-segment within the time interval between the two successive pilot bursts 223 and 227. The coefficients are thus interpolated substantially in a linear manner. Linear interpolation of a coefficient applicable to a sub-segment means that the coefficient is calculated by combining weighted values of the coefficient of the same tap trained on the pilot bursts immediately preceding and immediately following the sub-segment; the weights given to the trained coefficients immediately preceding and immediately following the coefficient applicable to the sub-segment are inversely related to the distance between the sub-segment and the immediately preceding and the immediately following pilot burst. Thus, if the time distance between the center of the sub-segment and the center of the immediately preceding pilot burst is x, and the time distance between the center of the sub-segment and the center of the immediately following pilot burst is y, then the relative weight given to the corresponding coefficient trained on the immediately preceding pilot burst is (y/(x+y)), and the relative weight given to the corresponding coefficient trained on the immediately following pilot burst is (x/(x+y)). As illustrated in the above example, this weighting relationship may be adhered to substantially rather than precisely, with small deviations, for example, due to quantization of time intervals (chip length).

It should be understood that the above formulas and other descriptions of interpolation in this document imply the same type of operation being performed on each of the individual coefficients within each coefficient set. By way of explanatory example, assume that each set of coefficients is represented by a vector of the type $\{c_j[1], c_j[2] \ldots c_j[n]\}$ where the subscript is the sub-segment index and the bracketed quantity is the tap index corresponding to the individual taps within the equalizer. Assume also that $CT_k=\{ct_k[1], ct_k[2], \ldots ct_k[n]\}$, where the bracketed quantity is also the tap index. Assume further that $CT_{k+1}=\{ct_{k+1}[1], ct_{k+1}[2], \ldots ct_{k+1}[n]\}$, where the bracketed quantity is again the tap index. The coefficients corresponding to the same tap are interpolated in the same way:

$$c_1[m]=(4/5)*ct_k[m]+(1/5)*ct_{k+1}[m],$$

$$c_2[m]=(3/5)*ct_k[m]+(2/5)*ct_{k+1}[m],$$

$$c_3[m]=(2/5)*ct_k[m]+(3/5)*ct_{k+1}[m], \text{ and}$$

$c_4[m]=(1/5)*ct_k[m]+(4/5)*ct_{k+1}[m]$, for all m between 1 and the number representing the highest tap index in the equalizer.

In some variants, the coefficients used for demodulating sub-segments adjacent to a particular pilot burst (with its accompanying MAC portions) are not interpolated, but instead the coefficients obtained from training the equalizer for the pilot burst are used directly for such subsegments. The immediately preceding example would then be modified so that $C_{k,1}=CT_k$, and $C_{k,4}=CT_{k+1}$, while $C_{k,2}$ and $C_{k,3}$ are still interpolated as described above.

A tap shift may occur from one pilot burst training to a following pilot burst training. This may be due to a change in the center of mass or timing slide, which is the drift in the equalizer center of mass time offset due to the coarse frequency offset change between the base station and the access terminal over time. For improved equalizer performance, it may be desirable to keep the equalizer approximately centered, so that the strongest multipath signals fall within a certain time span to the left and right of the center of the adaptive finite impulse response filter. Tap shifting logic, in combination with tap zeroing logic, may do this job and shift the coefficients of the equalizer to left or right, as needed to keep the equalizer approximately centered. Zero valued tap coefficients may be shifted-in to fill the leading or trailing taps, depending on the direction of the shift. This is used to correct the timing of the equalizer. Tap shifting is described in more detail in a commonly-assigned U.S. Pat. No. 7,012,952, entitled Method and Apparatus for Adjusting Delay in Systems With Time-Burst Pilot and Fractionally Spaced Equalizers.

Equalizer coefficients are then shifted in the correct direction before a pilot training starts. In such cases, the history is also shifted in the same manner, so that interpolation of coefficients is done on correct indices. History in this context means two sets of coefficients in memory from the previous two pilot bursts.

Figure 3:
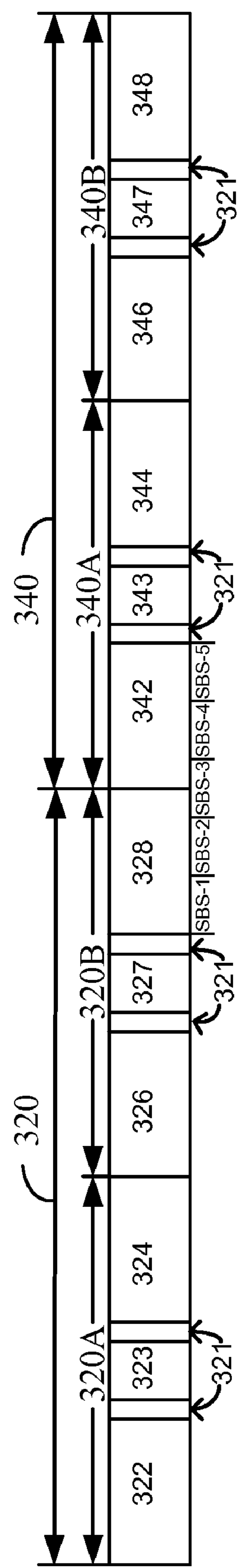
FIG. 3 illustrates selected elements of frames of a forward link wherein traffic half-slots are sub-segmented for interpolation of equalizer coefficients and/or SINR values, and wherein a sub-segment crosses a segment boundary, a half-slot boundary, and a time-slot boundary.

The process of sub-segmentation need not necessarily be performed so that each sub-segment is entirely contained within a single segment, a single half-slot, or a single time slot. In variants, a sub-segment may cross a segment boundary, a half-slot boundary, or a time slot boundary. FIG. 3 illustrates an example where a sub-segment crosses a time slot boundary (and also segment and half-slot boundaries). As shown in FIG. 3, a time slot 320 includes half-slots 320A and 320B, with a pilot burst 323 in the middle of the half-slot 320A, and another pilot burst 327 in the middle of the half-slot 320B; a time slot 340 similarly has half-slots 340A and 340B, with pilot bursts 343 and 347 in the middle of each half-slot. Each of the pilot bursts 323/327/343/347 is surrounded by adjacent MAC portions 321. Each combination of a pilot burst and its adjacent MAC portions breaks the corresponding half-slot into two traffic carrying segments, which are, in progressive time order, segments 322, 324, 326, 328, 342, 344, 346, and 348. So far, this is essentially the same slot structure as that shown in FIG. 2. Here, however, each set of two adjacent segments is broken into five (an odd number) of sub-segments. The segments 328 and 342 (which lie between pilot bursts 327 and 343, and adjacent to each other) are now broken into sub-segments SBS-1, SBS-2, SBS-3, SBS-4, and SBS-5. Note that SBS-3 straddles segment, half-slot, and time slot boundaries.

The equalizer is again trained on the pilot bursts 327 and 343 to obtain sets of trained coefficients $CT_k$ and $CT_{k+1}$, respectively. To demodulate a particular sub-segment, a set of coefficients is obtained by interpolating between the trained coefficient sets surrounding the particular segment. For example, the sets of coefficients $C_{k,1}$ through $C_{k,5}$ for demodulating the sub-segments SBS-1 through SBS-5, respectively, may be obtained as follows:

$$C_{k,1}=(5/6)*CT_k+(1/6)*CT_{k+1};$$

$$C_{k,2}=(4/6)*CT_k+(2/6)*CT_{k+1};$$

$$C_{k,3}=(3/6)*CT_k+(3/6)*CT_{k+1}.$$

$$C_{k,4}=(2/6)*CT_k+(4/6)*CT_{k+1}; \text{ and}$$

$$C_{k,5}=(1/6)*CT_k+(5/6)*CT_{k+1}.$$

Again, it may be preferred not to interpolate the coefficients for the sub-segments immediately adjacent to the pilot burst, but rather use the sets of trained coefficients obtained for the adjacent pilot bursts to demodulate the particular sub-segments. For example, $C_{k,1}$ may then be set to $CT_k$, $C_{k,5}$ may be set to $CT_{k+1}$, and $C_{k,2}$ through $C_{k,4}$ may be interpolated as described above. More generally, coefficients for only some selected sub-segments may be obtained through interpolation of the trained coefficients surrounding the segments. Of course, as illustrated above, all of the coefficients may be interpolated.

While FIGS. 2 and 3 illustrate division of traffic segments into equal sub-segments, this need not always be the case. Some processes and systems use division into sub-segments not all of which are equal. Moreover, equalization need not be carried out for all data in the segments. In some systems, equalization is not performed for preambles within the traffic segments. In this case, there may be no need to include the preambles in the sub-segmentation process, or to perform interpolation for sub-segments that have only preamble data.

The received signal's SINR is sometimes used in processing the received signal.

SINR measurement is described in more detail in a commonly-assigned U.S. Pat. No. 7,106,792, entitled Method and Apparatus for Estimating the Signal to Interference-Plus-Noise Ratio of a Wireless Channel.

The received signal's SINR measured during pilot bursts may also be interpolated for the sub-segments and then used in processing the information in the traffic segments. For example, the SINR may be interpolated for scaling equalizer output before feeding the output to a block that calculates log likelihood ratio (LLR). SINR interpolation may be done in the same ways as are described throughout this document in relation to tap coefficients. Referring again to FIG. 3, let us designate the SINR measurements for pilot bursts 327 and 343 as $SM_k$ and $SM_{k+1}$, respectively. Then, the interpolated SINR values $SI_{k,1}$ through $SI_{k,5}$ for processing the sub-segments SBS-1 through SBS-5, respectively, may be obtained as follows:

$$SI_{k,1}=(5/6)*SM_k+(1/6)*SM_{k+1};$$

$$SI_{k,2}=(4/6)*SM_k+(2/6)*SM_{k+1};$$

$$SI_{k,3}=(3/6)*SM_k+(3/6)*SM_{k+1}.$$

$$SI_{k,4}=(2/6)*SM_k+(4/6)*SM_{k+1}; \text{ and}$$

$$SI_{k,5}=(1/6)*SM_k+(5/6)*SM_{k+1}.$$

SINR interpolation may be carried out in the linear domain/scale, as opposed to logarithmic or decibel domain/scale. If for example, the SINR measurements $SM_k$ and $SM_{k+1}$ are made, stored, or otherwise available in decibels, they may first be converted to linear scale. Interpolation of the linear values may then be carried out, and the interpolated results may be converted into decibels and stored as decibel values.

As a person skilled in the art would understand after perusal of this document, the meaning of "linear" as applied to domain or scale is not the same as the meaning of "linear" as applied to the interpolation process itself. SINR may be interpolated in the linear domain using a non-linear interpolation method, for example.

SINR values for only some selected sub-segments may be obtained through interpolation of the SINR measurements obtained for pilot bursts. For example, SINR values used in processing of sub-segments immediately adjacent to a particular pilot burst may be set to the measured SINR value for the same particular pilot burst. Of course, as illustrated above, all of the SINR values may be interpolated.

Figure 4:
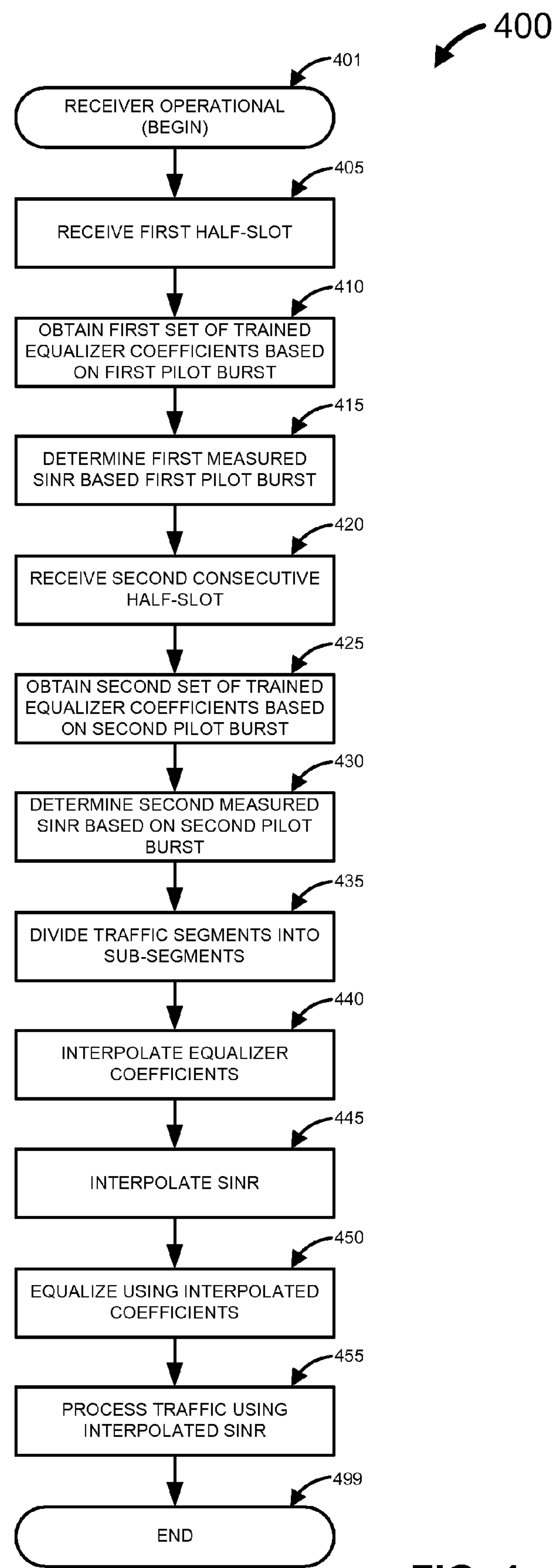
FIG. 4 illustrates selected steps of a process for operating a receiver with tap coefficients and SINR interpolation.

FIG. 4 illustrates selected steps of a process 400 for operating a receiver with tap coefficients and SINR interpolation. At flow point 401, the receiver is operational and configured to receive time-slots with pilot bursts in the middle of each half-slot, and traffic segments in at least parts of the remaining portions of the half-slots.

In step 405, a first half-slot is received, including a first pilot burst in the middle of the first half-slot and a first traffic segment following the first half-slot.

In step 410, an equalizer of the receiver is trained based on the first pilot burst to obtain a first set of trained equalizer coefficients.

In step 415, a first measured SINR is determined based on the first pilot burst.

In step 420, a second half-slot is received, including a second pilot burst in the middle of the second half-slot and a second traffic segment following the second half-slot.

In step 425, the equalizer of the receiver is trained based on the second pilot burst to obtain a second set of trained equalizer coefficients.

In step 430, a second measured SINR is determined based on the second pilot burst.

In step 435, the first and the second traffic segments are sub-segmented (divided) into three or more sub-segments.

In step 440, equalizer coefficients are interpolated between the first and the second set to obtain a set of interpolated coefficients for one or more of the sub-segments.

In step 445, SINR is interpolated between the first and the second measured SINR values to obtain interpolated SINR value or values for one or more of the sub-segments.

In step 450, the traffic in the sub-segments is equalized using the tap coefficients applicable to each sub-segment. The applicable tap-coefficients for at least one of the sub-segments have been determined by interpolation in the step 440. The traffic in the sub-segments is then demodulated.

In step 455, the demodulated traffic in the sub-segments is processed using the SINR values applicable to each sub-segment. For example, equalizer output is scaled using the SINR values. The applicable SINR for at least one of the sub-segments has been determined by interpolation in the step 445.

The process 400 then terminates at flow point 499. It should be noted that the process would typically be repeated with receipt of the following half-slots. Moreover, some of the steps (or results obtained in the steps) of one instance of the process 400 may be reused in the following instance of the same process.

SINR interpolation and tap coefficient interpolation may be practiced separately or together. Thus, a system may employ tap coefficient interpolation without SINR interpolation, it may employ SINR interpolation without tap coefficient interpolation, or it may employ both tap coefficient and SINR interpolation. In the latter case, the tap coefficients and SINR may be interpolated in the same way and over the same sub-segments; alternatively, they may be interpolated in different ways and/or over different sub-segments.

While the above examples illustrate linear or substantially linear interpolation, other kinds of interpolation may be used, for example, polynomial interpolation, including cubic interpolation. Averaging technique may also be used. Averaging means the use of the average of the coefficient values trained on successive pilot bursts for a given tap for all sub-segments lying between the successive pilot bursts. For coefficient interpolation, linear interpolation may be combined with averaging of coefficients. The following formula may be used for determining a given tap coefficient $c'_k$ for a sub-segment between two successive pilot bursts designated with half-slot time indices [n−2] (the earlier in time index) and [n−1] (the index following in time):

$$c'_k = \frac{Avg}{2} * [c_k[n-1] + c_k[n-2]] + \frac{(1-Avg)}{2^{10}} * [\alpha * c_k[n-2] + (2^{10} - \alpha) * c_k[n-1]]$$

The above formula assumes 1024 ($2^{10}$) chip distance between pilot bursts, and hence the appearance of the $2^{10}$ value for the time distance. In the formula, $c_k[n-1]$ and $c_k[n-2]$ stand, respectively, for the values of the given tap coefficient trained on the pilot bursts in the [n−1] and [n−2] half-slots; the interpolation factor $\alpha$ is the distance from the center of the sub-segment to the center of the pilot burst at index [n−1]; and Avg is the averaging factor that balances the weight of averaging (or smoothing) and linear interpolation. For instance, Avg=0 reduces the formula to linear interpolation only, Avg=1 reduces the formula to averaging only, whereas Avg=0.5 gives equal weight to averaging and linear interpolation.

A non-exclusive example of different kinds of interpolation is where the system interpolates the tap coefficients linearly, while using cubic interpolation for SINR. Another non-exclusive example is where the system interpolates linearly only the tap coefficients for sub-segments that are not adjacent to pilot bursts, while interpolating SINR for all sub-segments using cubic interpolation. Still another non-exclusive example is where the system uses a greater number of sub-segments for SINR interpolation than the number of sub-segments it uses for coefficient interpolation. Many other examples are of course also possible.

The processes and systems described in this document may be used in data-optimized systems, that is, systems optimized for data transmission (as opposed to voice transmission), and in particular such systems are optimized for downlink (forward link) data transmission. Data-optimized systems need not exclude uplink (reverse link) data transmission, or voice transmission in either direction. It should be noted that voice may be transmitted as data, for example, in the case of voice over internet protocol (VoIP) transmissions. The processes and systems may also be used in data-only systems, that is, systems used for data transmission only. Still further, the processes and systems may be used in voice transmission as such, that is, voice transmission not using VoIP.

The processes and systems described may be used in access terminals of a wireless cellular communication system. The processes and systems may also (or instead) be used on the radio network side of the wireless cellular communication system, for example, in a base transceiver station. The process and systems may be used with or without a Rake receiver.

In some systems, steps for interpolating equalizer coefficients are stored in firmware, while in other systems, the steps are stored in software. These storage selections, however, are not necessarily required in all systems.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be required in every system in accordance with the invention, while some steps and decisions that have not been specifically illustrated may be desirable or necessary in some systems in accordance with the invention.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm that may have been described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein, but is to be accorded the widest scope consistent with the principles and novel features disclosed herein.

What is claimed is:

1. A method for operating a receiver in a wireless communication system, the method comprising:

receiving a frame including a plurality of time slots, each time slot of the plurality of time slots comprising two half-slots, each half-slot comprising two traffic segments and a pilot burst between the two traffic segments, wherein the plurality of time slots comprises a first half-slot and a second half-slot following the first half-slot, the first half-slot comprising a first pilot burst and a first traffic segment following the first pilot burst, the second half-slot comprising a second traffic segment and a second pilot burst following the second traffic segment;

dividing the first and second traffic segments into a plurality of sub-segments, the plurality of sub-segments comprising a first sub-segment and a second sub-segment following the first sub-segment;

training an equalizer of the receiver on the first pilot burst to obtain a first plurality of trained tap coefficients;

training the equalizer of the receiver on the second pilot burst to obtain a second plurality of trained tap coefficients;

interpolating between the first and the second pluralities of trained tap coefficients to obtain a first set of interpolated tap coefficients for the first sub-segment;

measuring signal to interference and noise ratio of the first pilot burst to obtain a first measured SINR;

measuring signal to interference and noise ratio of the second pilot burst to obtain a second measured SINR;

interpolating between the first measured SINR and the second measured SINR to obtain a first interpolated SINR for the first sub-segment;

equalizing the first sub-segment by using the first set of interpolated tap coefficients;

scaling a result of equalizing the first sub-segment by the first interpolated SINR to obtain a first set of scaled data; and decoding the first sub-segment using the first set of scaled data.

2. The method of claim 1, wherein decoding comprises:

calculating a first log likelihood ratio of the first set of scaled data; and decoding the first sub-segment using the first log likelihood ratio.

3. The method of claim 2, wherein interpolating between the first measured SINR and the second measured SINR comprises interpolating in linear domain.

4. The method of claim 2, wherein dividing is performed so that the plurality of sub-segments further comprises a third sub-segment preceding the first sub-segment, the method further comprising:

interpolating between the first measured SINR and the second measured SINR to obtain a second interpolated SINR for the second sub-segment;

interpolating between the first measured SINR and the second measured SINR to obtain a third interpolated SINR for the third sub-segment;

scaling output of the equalizer corresponding to the second sub-segment by the second interpolated SINR to obtain a second set of scaled data;

scaling output of the equalizer corresponding to the third sub-segment by the third interpolated SINR to obtain a third set of scaled data;

calculating a log likelihood ratio of the second set of scaled data; and calculating a log likelihood ratio of the third set of scaled data.

5. The method of claim 2, wherein dividing is performed so that the plurality of sub-segments further comprises a third sub-segment preceding the first sub-segment, the method further comprising:

scaling output of the equalizer corresponding to the second sub-segment by the second measured SINR to obtain a second set of scaled data;

scaling output of the equalizer corresponding to the third sub-segment by the first measured SINR to obtain a third set of scaled data;

calculating a log likelihood ratio of the second set of scaled data; and calculating a log likelihood ratio of the third set of scaled data.

6. A method for operating a receiver in a wireless communication system, the method comprising steps of:

receiving a frame including a plurality of time slots, each time slot of the plurality of time slots comprising two half-slots, each half-slot comprising two traffic segments and a pilot burst between the two traffic segments, wherein the plurality of time slots comprises a first half-slot and a second half-slot following the first half-slot, the first half-slot comprising a first pilot burst and a first traffic segment following the first pilot burst, the second half-slot comprising a second traffic segment and a second pilot burst following the second traffic segment;

dividing the first and second traffic segments into a plurality of sub-segments, the plurality of sub-segments comprising a first sub-segment and a second sub-segment following the first sub-segment;

measuring signal to interference and noise ratio of the first pilot burst to obtain a first measured SINR;

measuring signal to interference and noise ratio of the second pilot burst to obtain a second measured SINR;

interpolating between the first measured SINR and the second measured SINR to obtain a first interpolated SINR for the first sub-segment; and providing a data in the plurality of sub-segments to a user.

7. The method of claim 6, wherein the receiver comprises an equalizer, the method further comprising:

scaling output of the equalizer corresponding to the first sub-segment by the first interpolated SINR to obtain a first set of scaled data;

calculating a first log likelihood ratio of the first set of scaled data; and decoding the first sub-segment using the first log likelihood ratio.

8. The method of claim 7, wherein interpolating between the first measured SINR and the second measured SINR comprises interpolating in linear domain.

9. The method of claim 7, wherein the plurality of sub-segments further comprises a third sub-segment preceding the first sub-segment, the method further comprising:

interpolating between the first measured SINR and the second measured SINR to obtain a second interpolated SINR for the second sub-segment;

interpolating between the first measured SINR and the second measured SINR to obtain a third interpolated SINR for the third sub-segment;

scaling output of the equalizer corresponding to the second sub-segment by the second interpolated SINR to obtain a second set of scaled data;

scaling output of the equalizer corresponding to the third sub-segment by the third interpolated SINR to obtain a third set of scaled data;

calculating a log likelihood ratio of the second set of scaled data; and calculating a log likelihood ratio of the third set of scaled data.

10. The method of claim 7, wherein the plurality of sub-segments further comprises a third sub-segment preceding the first sub-segment, the method further comprising:

scaling output of the equalizer corresponding to the second sub-segment by the second measured SINR to obtain a second set of scaled data;

scaling output of the equalizer corresponding to the third sub-segment by the first measured SINR to obtain a third set of scaled data;

calculating a log likelihood ratio of the second set of scaled data; and calculating a log likelihood ratio of the third set of scaled data.

11. A wireless terminal comprising:

a receiver;

a memory; and a controller coupled to the receiver and the memory, the controller is configured to:

receive a plurality of time slots, each time slot of the plurality of time-slots comprising two half-slots, each half-slot comprising two traffic segments and a pilot burst between the two traffic segments, wherein the plurality of time slots comprises a first half-slot and a second half-slot following the first half-slot, the first half-slot comprising a first pilot burst and a first traffic segment following the first pilot burst, the second half-slot comprising a second traffic segment and a second pilot burst following the second traffic segment, wherein the first half-slot and the second half-slot are not separated by any other half-slot;

divide the first and the second traffic segments into a plurality of sub-segments, the plurality of sub-segments comprising a first sub-segment and a second sub-segment following the first sub-segment;

train an equalizer on the first pilot burst to obtain a first plurality of trained tap coefficients;

train the equalizer on the second pilot burst to obtain a second plurality of trained tap coefficients;

interpolate between the first and the second pluralities of trained tap coefficients to obtain a first set of interpolated tap coefficients for the first sub-segment;

equalize the first sub-segment by using the equalizer with the first set of interpolated tap coefficients;

measure signal to interference and noise ratio of the first pilot burst to obtain a first measured SINR;

measure signal to interference and noise ratio of the second pilot burst to obtain a second measured SINR;

interpolate between the first measured SINR and the second measured SINR to obtain a first interpolated SINR for the first sub-segment;

scale output of the equalizer corresponding to the first sub-segment by the first interpolated SINR to obtain a first set of scaled data; and decode the first sub-segment based on the firs set of scaled data.

12. The wireless terminal of claim 11, wherein the controller is further configured to decode the first sub-segment by:

calculating a first log likelihood ratio of the first set of scaled data; and decoding the first sub-segment using the first log likelihood ratio.

13. The wireless terminal of claim 12, wherein interpolating between the first measured SINR and the second measured SINR comprises interpolating in linear domain.

14. The wireless terminal of claim 12, wherein the plurality of sub-segments further comprises a third sub-segment preceding the first sub-segment, and the controller is further configured to:

interpolate between the first measured SINR and the second measured SINR to obtain a second interpolated SINR for the second sub-segment;

interpolate between the first measured SINR and the second measured SINR to obtain a third interpolated SINR for the third sub-segment;

scale output of the equalizer corresponding to the second sub-segment by the second interpolated SINR to obtain a second set of scaled data;

scale output of the equalizer corresponding to the third sub-segment by the third interpolated SINR to obtain a third set of scaled data;

calculate a log likelihood ratio of the second set of scaled data; and calculate a log likelihood ratio of the third set of scaled data.

15. The wireless terminal of claim 12, wherein the plurality of sub-segments further comprises a third sub-segment preceding the first sub-segment, and the controller is further configured to:

scale output of the equalizer corresponding to the second sub-segment by the second measured SINR to obtain a second set of scaled data;

scale output of the equalizer corresponding to the third sub-segment by the first measured SINR to obtain a third set of scaled data;

calculate a log likelihood ratio of the second set of scaled data; and calculate a log likelihood ratio of the third set of scaled data.

16. A wireless terminal comprising:

a receiver;

a memory; and a controller coupled to the receiver and the memory, the controller configured to:

receive a plurality of time slots, each time slot of the plurality of time-slots comprising two half-slots, each half-slot comprising two traffic segments and a pilot burst between the two traffic segments, wherein the plurality of time slots comprises a first half-slot and a second half-slot following the first half-slot, no half-slot separating the first half-slot and the second half-slot, the first half-slot comprising a first pilot burst and a first traffic segment following the first pilot burst, the second half-slot comprising a second traffic segment and a second pilot burst following the second traffic segment;

divide the first and the second traffic segments into a plurality of sub-segments, the plurality of sub-segments comprising a first sub-segment and a second sub-segment following the first sub-segment;

measure signal to interference and noise ratio of the first pilot burst to obtain a first measured SINR;

measure signal to interference and noise ratio of the second pilot burst to obtain a second measured SINR;

interpolate between the first measured SINR and the second measured SINR to obtain a first interpolated SINR for the first sub-segment;

scale equalizer output corresponding to the first sub-segment by the first interpolated SINR to obtain a first set of scaled data; and decode data in the plurality of sub-segments based on the first set of scaled data and provide the data to a user.

17. The wireless terminal of claim 16, wherein the controller is further configured to decode data by:

calculating a first log likelihood ratio of the first set of scaled data; and decoding the first sub-segment using the first log likelihood ratio.

18. The wireless terminal of claim 17, wherein the controller is configured to interpolate between the first measured SINR and the second measured SINR by interpolating in linear domain.

19. The wireless terminal of claim 17, wherein the plurality of sub-segments further comprises a third sub-segment preceding the first sub-segment, and the controller is further configured to:

interpolate between the first measured SINR and the second measured SINR to obtain a second interpolated SINR for the second sub-segment;

interpolate between the first measured SINR and the second measured SINR to obtain a third interpolated SINR for the third sub-segment;

scale equalizer output corresponding to the second sub-segment by the second interpolated SINR to obtain a second set of scaled data;

scale equalizer output corresponding to the third sub-segment by the third interpolated SINR to obtain a third set of scaled data;

calculate a log likelihood ratio of the second set of scaled data; and calculate a log likelihood ratio of the third set of scaled data.

20. The wireless terminal of claim 17, wherein the plurality of sub-segments further comprises a third sub-segment preceding the first sub-segment, and the controller is further configured to:

scale equalizer output corresponding to the second sub-segment by the second measured SINR to obtain a second set of scaled data;

scale equalizer output corresponding to the third sub-segment by the first measured SINR to obtain a third set of scaled data;

calculate a log likelihood ratio of the second set of scaled data; and calculate a log likelihood ratio of the third set of scaled data.

21. A wireless terminal comprising:

means for receiving a wireless signal;

means for equalizing;

means for storing data; and means for processing, the means for processing being coupled to the means for receiving, the means for equalizing, and the means for storing, wherein the means for processing is configured to:

receive a plurality of time slots, each time slot of the plurality of time-slots comprising two half-slots, each half-slot comprising two traffic segments and a pilot burst between the two traffic segments, wherein the plurality of time slots comprises a first half-slot and a second half-slot following the first half-slot, no half-slot separating the first half-slot and the second half-slot, the first half-slot comprising a first pilot burst and a first traffic segment following the first pilot burst, the second half-slot comprising a second traffic segment and a second pilot burst following the second traffic segment;

divide the first and the second traffic segments into a plurality of sub-segments, the plurality of sub-segments comprising a first sub-segment and a second sub-segment following the first sub-segment;

measure signal to interference and noise ratio of the first pilot burst to obtain a first measured SINR;

measure signal to interference and noise ratio of the second pilot burst to obtain a second measured SINR;

interpolate between the first measured SINR and the second measured SINR to obtain a first interpolated SINR for the first sub-segment; and decode data in at least one of the sub-segments, based at least in part on the first interpolated SINR and provide the data to a user.

22. A The machine-readable medium comprising instructions that when executed by at least one processor of a wireless access terminal, cause the wireless access terminal to perform steps comprising:

receiving a plurality of time slots, each time slot of the plurality of time-slots comprising two half-slots, each half-slot comprising two traffic segments and a pilot burst between the two traffic segments, wherein the plurality of time slots comprises a first half-slot and a second half-slot following the first half-slot, the first half-slot comprising a first pilot burst and a first traffic segment following the first pilot burst, the second half-slot comprising a second traffic segment and a second pilot burst following the second traffic segment;

dividing the first and the second traffic segments into a plurality of sub-segments, the plurality of sub-segments comprising a first sub-segment and a second sub-segment following the first sub-segment;

training an equalizer on the first pilot burst to obtain a first plurality of trained tap coefficients;

training the equalizer on the second pilot burst to obtain a second plurality of trained tap coefficients;

interpolating between the first and the second pluralities of trained tap coefficients to obtain a first set of interpolated tap coefficients for the first sub-segment;

equalizing the first sub-segment by using the first set of interpolated tap coefficients measuring signal to interference and noise ratio of the first pilot burst to obtain a first measured SINR;

measuring signal to interference and noise ratio of the second pilot burst to obtain a second measured SINR;

interpolating between the first measured SINR and the second measured SINR to obtain a first interpolated SINR for the first sub-segment;

scaling output of the equalizer corresponding to the first sub-segment by the first interpolated SINR to obtain a first set of scaled data; and decoding the first sub-segment based on the first set of scaled data.

23. The machine-readable medium of claim 22, wherein decoding comprises:

calculating a first log likelihood ratio of the first set of scaled data; and decoding the first sub-segment using the first log likelihood ratio.

24. The machine-readable medium of claim 23, wherein the step of interpolating between the first measured SINR and the second measured SINR comprises interpolating in linear domain.

25. The machine-readable medium of claim 23, wherein the plurality of sub-segments further comprises a third sub-segment preceding the first sub-segment, and the steps further comprise:

interpolating between the first measured SINR and the second measured SINR to obtain a second interpolated SINR for the second sub-segment;

interpolating between the first measured SINR and the second measured SINR to obtain a third interpolated SINR for the third sub-segment;

scaling output of the equalizer corresponding to the second sub-segment by the second interpolated SINR to obtain a second set of scaled data;

scaling output of the equalizer corresponding to the third sub-segment by the third interpolated SINR to obtain a third set of scaled data;

calculating a log likelihood ratio of the second set of scaled data; and calculating a log likelihood ratio of the third set of scaled data.

26. The machine-readable medium of claim 23, wherein the plurality of sub-segments further comprises a third sub-segment preceding the first sub-segment, and the steps further comprise:

scaling output of the equalizer corresponding to the second sub-segment by the second measured SINR to obtain a second set of scaled data;

scaling output of the equalizer corresponding to the third sub-segment by the first measured SINR to obtain a third set of scaled data;

calculating a log likelihood ratio of the second set of scaled data; and calculating a log likelihood ratio of the third set of scaled data.

27. A machine-readable medium comprising instructions, the instructions, when executed by at least one processor of a wireless access terminal, cause the wireless access terminal to perform steps comprising:

receiving a plurality of time slots, each time slot of the plurality of time-slots comprising two half-slots, each half-slot comprising two traffic segments and a pilot burst between the two traffic segments, wherein the plurality of time slots comprises a first half-slot and a second half-slot following the first half-slot, no half-slot separating the first half-slot and the second half-slot, the first half-slot comprising a first pilot burst and a first traffic segment following the first pilot burst, the second half-slot comprising a second traffic segment and a second pilot burst following the second traffic segment;

dividing the first and the second traffic segments into a plurality of sub-segments, the plurality of sub-segments comprising a first sub-segment and a second sub-segment following the first sub-segment;

measuring signal to interference and noise ratio of the first pilot burst to obtain a first measured SINR;

measuring signal to interference and noise ratio of the second pilot burst to obtain a second measured SINR;

interpolating between the first measured SINR and the second measured SINR to obtain a first interpolated SINR for the first sub-segment; and decoding data in at least one of the sub-segments, based at least in part on the first interpolated SINR and providing the data to a user.

28. The machine-readable medium of claim 27, wherein decoding comprises:

scaling output of an equalizer corresponding to the first sub-segment by the first interpolated SINR to obtain a first set of scaled data;

calculating a first log likelihood ratio of the first set of scaled data; and decoding the first sub-segment using the second log likelihood ratio.

29. The machine-readable medium of claim 28, wherein the step of interpolating between the first measured SINR and the second measured SINR comprises interpolating in linear domain.

30. The machine-readable medium of claim 28, wherein the plurality of sub-segments further comprises a third sub-segment preceding the first sub-segment, and the steps further comprise:

interpolating between the first measured SINR and the second measured SINR to obtain a second interpolated SINR for the second sub-segment;

interpolating between the first measured SINR and the second measured SINR to obtain a third interpolated SINR for the third sub-segment;

scaling output of the equalizer corresponding to the second sub-segment by the second interpolated SINR to obtain a second set of scaled data;

scaling output of the equalizer corresponding to the third sub-segment by the third interpolated SINR to obtain a third set of scaled data;

calculating a log likelihood ratio of the second set of scaled data; and calculating a log likelihood ratio of the third set of scaled data.

31. The machine-readable medium of claim 28, wherein the plurality of sub-segments further comprises a third sub-segment preceding the first sub-segment, and the steps further comprise:

scaling output of the equalizer corresponding to the second sub-segment by the second measured SINR to obtain a second set of scaled data;

scaling output of the equalizer corresponding to the third sub-segment by the first measured SINR to obtain a third set of scaled data;

calculating a log likelihood ratio of the second set of scaled data; and calculating a log likelihood ratio of the third set of scaled data.

32. A method for operating a receiver in a wireless communication system, the method comprising:

receiving a frame including a plurality of time slots, each time slot of the plurality of time slots having a first pilot burst and a first traffic segment following the first pilot burst, and a second traffic segment and a second pilot burst following the second traffic segment;

dividing the first and second traffic segments into a plurality of sub-segments, the plurality of sub-segments comprising a first sub-segment and a second sub-segment following the first sub-segment;

training an equalizer of the receiver on the first pilot burst to obtain a first plurality of trained tap coefficients;

training the equalizer of the receiver on the second pilot burst to obtain a second plurality of trained tap coefficients; and generating a first set of segment equalizing tap coefficients based on the first and the second pluralities of trained tap coefficients, wherein the generating includes calculating a plurality of average coefficients, each average coefficient being an average of a corresponding one of the first trained tap coefficients and the second trained tap coefficients, interpolating between each of the first trained tap coefficients and a corresponding one of the second trained tap coefficients to generate a plurality of interpolated coefficients, weighting, based on a given averaging factor (Avg), a given interpolation factor (α), and a chip distance (ChipDist) between the first pilot burst and the second pilot burst, each of the plurality of average coefficients differently from a corresponding interpolated coefficient to generate a set of weighted average coefficients and a corresponding set of weighted interpolated coefficients;

adding each weighted average coefficient and to a corresponding weighted interpolated coefficient to generate the first set of segment weighted equalizing tap coefficients; and equalizing the first sub-segment by using the first set of weighted equalizing tap coefficients to generate an equalized first sub-segment output.

33. The method of claim 32, wherein the weighting of each average tap coefficient is performed according to the following formula:

$$\frac{Avg}{2}*[C_k[n-1]+C_k[n-2]],$$

where $C_k$ [n−1] is the value of the tap coefficient trained on the pilot burst in the [n−1] time slot, $C_k$ [n−2] is the value of the tap coefficient trained on the pilot burst in the [n−2] time slot.

34. The method of claim 32, wherein weighting each of the plurality of average coefficients comprises multiplying each average coefficient by Avg to generate the set of weighted average coefficients, and weighting the plurality of interpolated coefficients is based on a weight equal to 1−Avg and on α, and outputs the result as the set weighted interpolated coefficients.

35. The method of claim 34, wherein the weighting of each average tap coefficient is performed according to the following formula:

$$\frac{Avg}{2}*[C_k[n-1]+C_k[n-2]],$$

where, $C_k$ [n−1] is the value of the tap coefficient trained on the pilot burst in the [n−1] time slot, $C_k$ [n−2] is the value of the tap coefficient trained on the pilot burst in the [n−2] time slot.

36. The method of claim 35, wherein the weighting of each interpolated tap coefficient, based on Avg and α, is performed according to the following formula:

$$\frac{(1-Avg)}{ChipDist}*[\alpha*C_k[n-2]+(ChipDist-\alpha)*C_k[n-1]],$$

where $C_k$ [n−1] is the value of the tap coefficient trained on the pilot burst in the [n−1] time slot, $C_k$ [n−2] is the value of the tap coefficient trained on the pilot burst in the [n−2] time slot.

37. The method of claim 32, further comprising:

measuring signal to interference and noise ratio of the first pilot burst to obtain a first measured SINR;

measuring signal to interference and noise ratio of the second pilot burst to obtain a second measured SINR;

interpolating between the first measured SINR and the second measured SINR to obtain a first interpolated SINR for the first sub-segment; and scaling the equalized first sub-segment output by the first interpolated SINR to obtain a first set of scaled data.

38. The method of claim 37, wherein decoding comprises:

calculating a first log likelihood ratio of the first set of scaled data; and decoding the first sub-segment using the second log likelihood ratio.

39. A receiver for wireless communication comprising:

means for receiving a frame including a plurality of time slots, each time slot of the plurality of time slots having a first pilot burst and a first traffic segment following the first pilot burst, and a second traffic segment and a second pilot burst following the second traffic segment;

means for dividing the first and second traffic segments into a plurality of sub-segments, the plurality of sub-segments comprising a first sub-segment and a second sub-segment following the first sub-segment;

means for training an equalizer of the receiver on the first pilot burst to obtain a first plurality of trained tap coefficients;

means for training the equalizer of the receiver on the second pilot burst to obtain a second plurality of trained tap coefficients; and means for generating a first set of segment equalizing tap coefficients based on the first and the second pluralities of trained tap coefficients, wherein the means for generating includes means for calculating a plurality of average coefficients, each average coefficient being an average of a corresponding one of the first trained tap coefficients and the second trained tap coefficients, means for interpolating between each of the first trained tap coefficients and a corresponding one of the second trained tap coefficients to generate a plurality of interpolated coefficients, means for weighting, based on a given averaging factor (Avg), a given interpolation factor ($\alpha$), and a chip distance (ChipDist) between the first pilot burst and the second pilot burst, each of the plurality of average coefficients differently from a corresponding interpolated coefficient to generate a set of weighted average coefficients and a corresponding set of weighted interpolated coefficients;

means for adding each weighted average coefficient and to a corresponding weighted interpolated coefficient to generate the first set of segment weighted equalizing tap coefficients; and means for equalizing the first sub-segment by using the first set of weighted equalizing tap coefficients and generating an equalized first sub-segment output.

40. The receiver of claim 39, further comprising:

means for measuring signal to interference and noise ratio of the first pilot burst to obtain a first measured SINR;

means for measuring signal to interference and noise ratio of the second pilot burst to obtain a second measured SINR;

means for interpolating between the first measured SINR and the second measured SINR to obtain a first interpolated SINR for the first sub-segment; and means for scaling the equalized first sub-segment output, by the first interpolated SINR, to obtain a first set of scaled data.

41. The receiver of claim 39, further comprising means for decoding the first set of scaled data to obtain a first segment data output.

42. The receiver of claim 41 wherein decoding comprises:

calculating a first log likelihood ratio of the first set of scaled data; and decoding the first sub-segment using the second log likelihood ratio.

43. A machine-readable medium comprising instructions that when executed by at least one processor of a wireless access terminal, cause the wireless access terminal to perform steps comprising:

receiving a frame including a plurality of time slots, each time slot of the plurality of time slots having a first pilot burst and a first traffic segment following the first pilot burst, and a second traffic segment and a second pilot burst following the second traffic segment;

dividing the first and second traffic segments into a plurality of sub-segments, the plurality of sub-segments comprising a first sub-segment and a second sub-segment following the first sub-segment;

training an equalizer of the receiver on the first pilot burst to obtain a first plurality of trained tap coefficients;

training the equalizer of the receiver on the second pilot burst to obtain a second plurality of trained tap coefficients; and generating a first set of segment equalizing tap coefficients based on the first and the second pluralities of trained tap coefficients, wherein the generating includes calculating a plurality of average coefficients, each average coefficient being an average of a corresponding one of the first trained tap coefficients and the second trained tap coefficients, interpolating between each of the first trained tap coefficients and a corresponding one of the second trained tap coefficients to generate a plurality of interpolated coefficients, weighting, based on a given averaging factor (Avg), a given interpolation factor ($\alpha$), and a chip distance (ChipDist) between the first pilot burst and the second pilot burst, each of the plurality of average coefficients differently from a corresponding interpolated coefficient to generate a set of weighted average coefficients and a corresponding set of weighted interpolated coefficients;

adding each weighted average coefficient and to a corresponding weighted interpolated coefficient to generate the first set of segment weighted equalizing tap coefficients; and equalizing the first sub-segment by using the first set of weighted equalizing tap coefficients to generate an equalized first sub-segment output.

44. The machine-readable medium of claim 43, wherein weighting of each average tap coefficient is performed according to the following formula:

$$\frac{Avg}{2} * [C_k[n-1] + C_k[n-2]],$$

where $C_k$ [n−1] is the value of the tap coefficient trained on the pilot burst in the [n−1] time slot, $C_k$ [n−2] is the value of the tap coefficient trained on the pilot burst in the [n−2] time slot.

45. The machine-readable medium of claim 43, wherein weighting each of the plurality of average coefficients includes multiplying each average coefficient by Avg to generate the set of weighted average coefficients, and weighting the plurality of interpolated coefficients is based on a weight equal to 1−Avg and on $\alpha$, and outputting the result as the set of weighted interpolated coefficients.

46. The machine-readable medium of claim 45, wherein weighting of each average tap coefficient is performed according to the following formula:

$$\frac{Avg}{2} * [C_k[n-1] + C_k[n-2]],$$

where, $C_k$ [n−1] is the value of the tap coefficient trained on the pilot burst in the [n−1] time slot, $C_k$ [n−2] is the value of the tap coefficient trained on the pilot burst in the [n−2] time slot.

47. The machine-readable medium of claim 46, wherein the weighting of each interpolated tap coefficient, based on Avg and α, is performed according to the following formula:

$$\frac{(1-Avg)}{ChipDist}*[\alpha*C_k[n-2]+(ChipDist-\alpha)*C_k[n-1]],$$

where $C_k$ [n−1] is the value of the tap coefficient trained on the pilot burst in the [n−1] time slot, $C_k$ [n−2] is the value of the tap coefficient trained on the pilot burst in the [n−2] time slot.

* * * * *